US011743855B2

(12) United States Patent
Albasheir et al.

(10) Patent No.: US 11,743,855 B2
(45) Date of Patent: *Aug. 29, 2023

(54) NETWORK-FUNCTION MONITORING AND CONTROL

(71) Applicant: T-Mobile USA, Inc., Bellevue, WA (US)

(72) Inventors: Suliman Albasheir, Issaquah, WA (US); Karunakalage Viraj Rakitha Silva, Renton, WA (US); Salvador Mendoza, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,922

(22) Filed: Sep. 4, 2020

(65) Prior Publication Data

US 2020/0404608 A1 Dec. 24, 2020

Related U.S. Application Data

(63) Continuation of application No. 16/536,211, filed on Aug. 8, 2019, now Pat. No. 10,772,062.

(Continued)

(51) Int. Cl.
*H04W 48/18* (2009.01)
*H04W 60/00* (2009.01)
*H04W 48/16* (2009.01)

(52) U.S. Cl.
CPC ........... *H04W 60/00* (2013.01); *H04W 48/16* (2013.01); *H04W 48/18* (2013.01)

(58) Field of Classification Search
CPC ............ H04M 1/006; H04M 1/72457; H04M 1/72478; H04M 15/00; H04M 15/09;
(Continued)

(56) References Cited

U.S. PATENT DOCUMENTS 8,159,961 B1 * 4/2012 Rai .................. H04L 67/01
370/252
8,453,205 B1 * 5/2013 Patil .................. H04L 67/63
380/279

(Continued)

FOREIGN PATENT DOCUMENTS

WO WO-2016050990 A1 * 4/2016 ............ H04L 63/08
WO WO-2017173967 A1 * 10/2017

*Primary Examiner* — Quan M Hua
(74) *Attorney, Agent, or Firm* — Lee & Hayes, P.C.

(57) ABSTRACT

A core network device of a telecommunications network can receive a first request from a consumer network function (NF) and forward the first request to a first provider NF. The device can subsequently detect a violation by the first provider NF of a response criterion. The device can receive a second request and forward the second request to a second, different provider NF in response to the violation. In some examples, the device can later detect that the first provider NF has satisfied the response criterion with respect to a third request. The device can modify load data to increase the proportion of subsequent requests for which the first provider NF is selected. The device can select provider NFs based on the load data. In some examples, a system can include a network registry device that selects NFs based on violation indications received from the core network device.

20 Claims, 9 Drawing Sheets

Related U.S. Application Data

(60) Provisional application No. 62/833,911, filed on Apr. 15, 2019.

(58) Field of Classification Search
CPC ...... H04M 15/58; H04M 15/64; H04M 15/66; H04M 15/83; H04M 15/85; H04W 12/069; H04W 12/086; H04W 28/0942; H04W 36/00; H04W 4/24; H04W 4/70; H04W 4/80; H04W 76/10; H04W 8/08; H04W 8/18; H04W 88/16; H04N 21/2543; H04L 67/1002; H04L 67/02; H04L 67/2814; H04L 63/0428; H04L 67/1008; H04L 63/0815; H04L 69/329; H04L 29/06; H04L 67/10
See application file for complete search history.

(56) References Cited

U.S. PATENT DOCUMENTS

| | | | | |
|---|---|---|---|---|
| 8,806,043 | B1 * | 8/2014 | Duraisamy | H04L 69/40 |
| | | | | 709/227 |
| 10,772,062 | B1 * | 9/2020 | Albasheir | H04W 48/16 |
| 2013/0290492 | A1 * | 10/2013 | ElArabawy | H04W 28/0231 |
| | | | | 709/219 |
| 2017/0118622 | A1 * | 4/2017 | Jiang | H04W 4/20 |
| 2017/0163644 | A1 * | 6/2017 | Horii | H04L 63/10 |

* cited by examiner

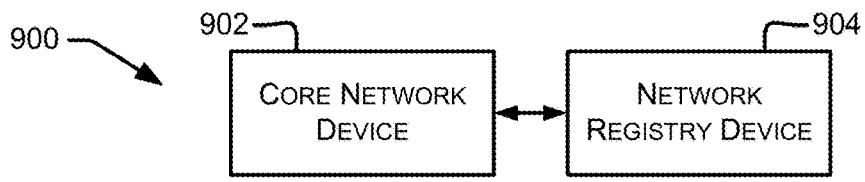
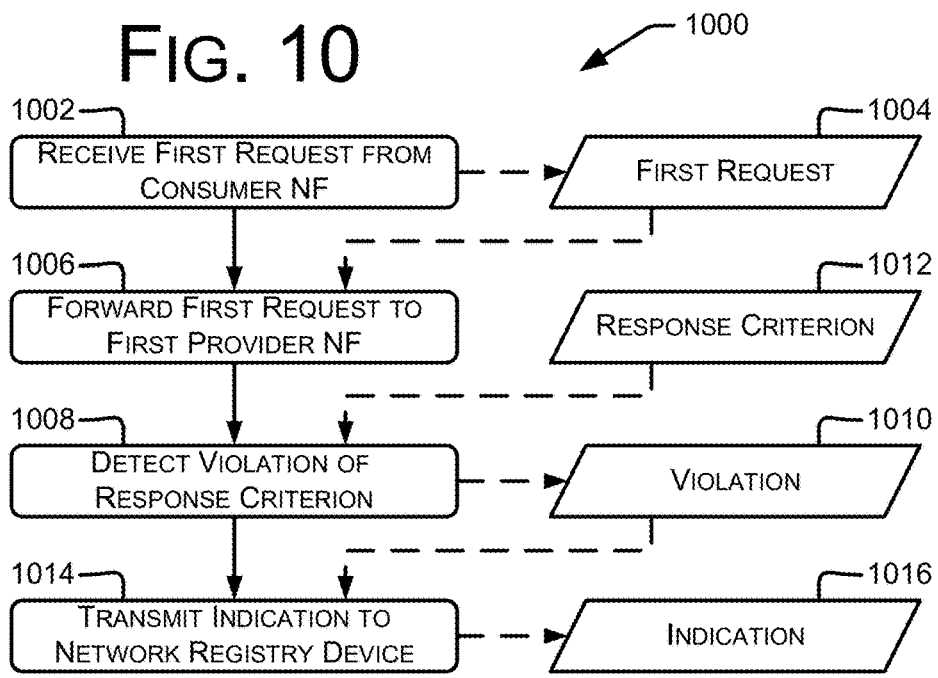
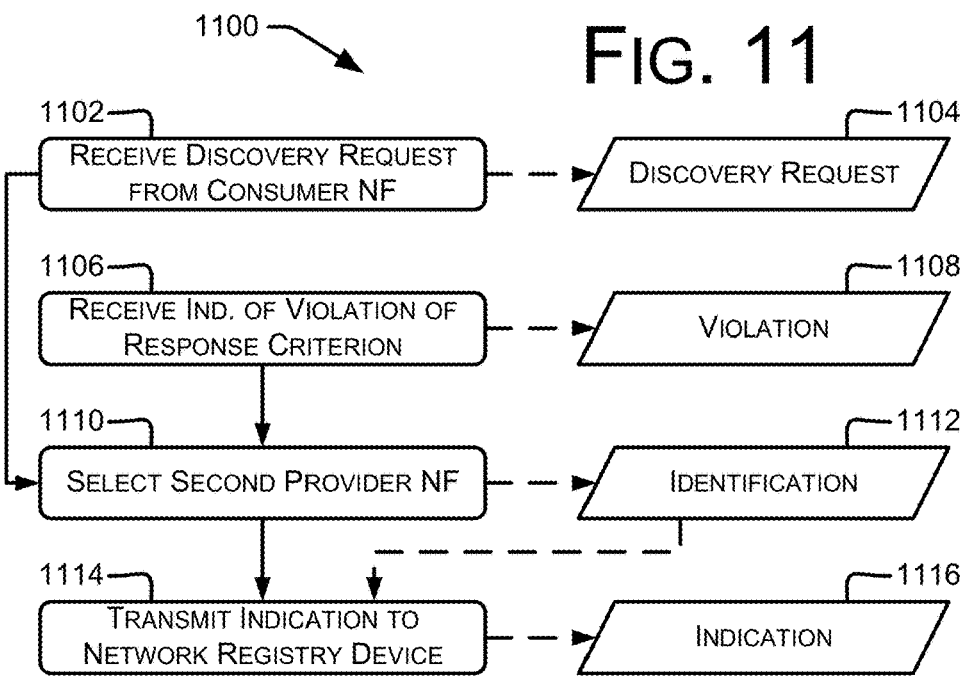

NETWORK-FUNCTION MONITORING AND CONTROL

RELATED APPLICATIONS

This application is a continuation of and claims priority to and the benefit of U.S. patent application Ser. No. 16/536,211, filed Aug. 8, 2019, entitled "Network-Function Monitoring and Control," which is a nonprovisional application of and claims priority to and the benefit of U.S. Patent Application Ser. No. 62/833,911, filed Apr. 15, 2019, entitled "Network-Function Management," the entirety of both which are incorporated herein by reference.

BACKGROUND

In 5G and other cellular systems, core-network services are provided by network functions (NFs). In some systems, NFs are configured with network hostnames or addresses of NFs with which they may need to communicate. In other systems, provider NFs register with a registry device, such as a 5G Network Resource Function (NRF). A consumer network function (NF) that wishes to use the services of a provider NF requests network information of that provider NF from the registry device. However, individual provider NFs may not always provide uniform levels of service, e.g., due to overload or to events affecting network connectivity.

BRIEF DESCRIPTION OF THE DRAWINGS

Objects, features, and advantages of various examples will become more apparent when taken in conjunction with the following description and drawings wherein identical reference numerals have been used, where possible, to designate identical features that are common to the figures. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

FIG. 9 illustrates an example system for managing network requests.

FIG. 10 is a dataflow diagram illustrating an example technique for processing a network request, and related data items, according to various examples.

FIG. 11 is a dataflow diagram illustrating an example technique for selecting a provider NF, and related data items, according to various examples.

DETAILED DESCRIPTION

Overview

Figure 1:
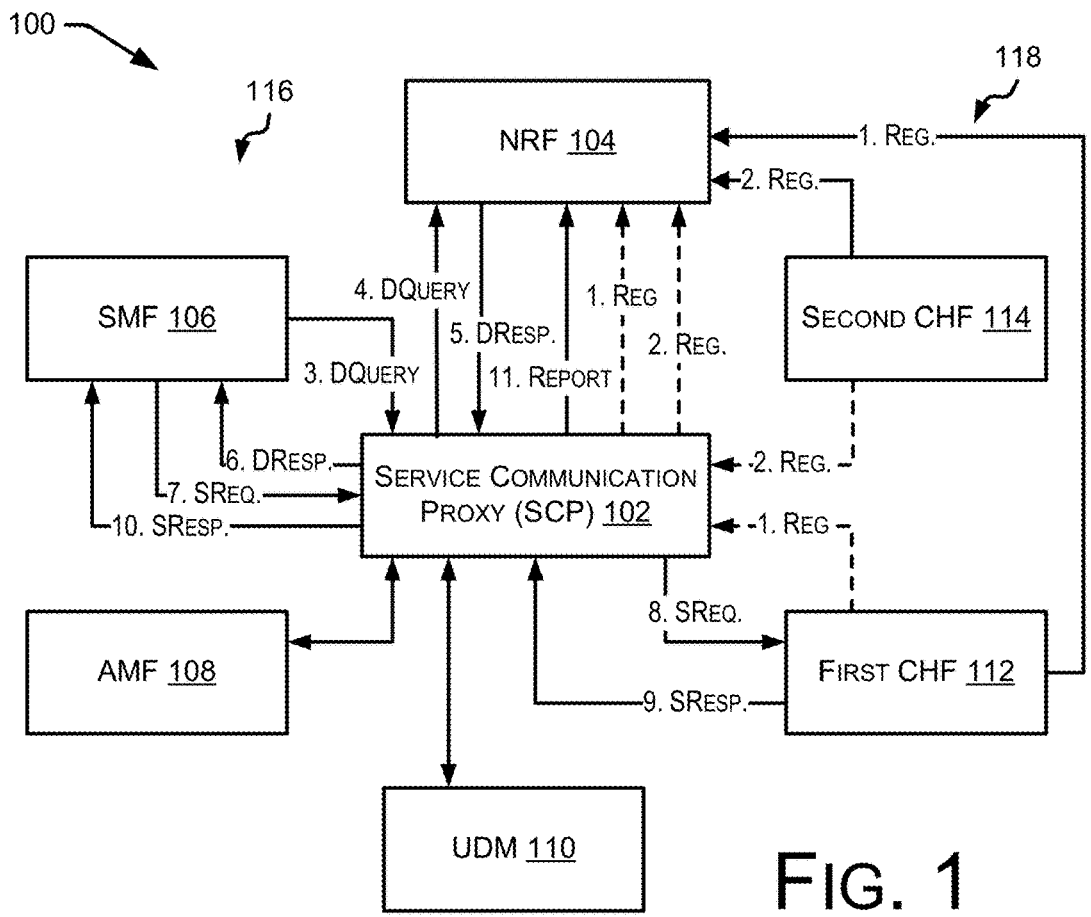
FIG. 1 shows an example network system and messages according to various examples.

NRF(s) in a cellular (e.g., 5G) network track the available NFs (e.g., in a 5G core network) that can provide a specific service. Each NF carries out a registration procedure to register to the NRF when that NF goes online. Consumer NFs requiring the service of provider NFs then query the NRF to discover the available NFs that can provide the requested service. For example, an AMF can query an NRF to locate a Session Management Function (SMF). Although many examples herein are given in the context of No 3GPP No 5G systems, other examples use DNS queries for SRV and NAPTR records to perform discovery, and use DNS servers as registry devices.

However, the NRF may not have current information on the capacity of a provider NF to service requests. For example, a provider NF may become unable to process requests, or may be delayed in processing requests, due to an overload. Additionally or alternatively, a provider NF may be drop offline, e.g., due to power failures or network-connectivity interruptions such as fiber cuts.

In some examples, a Service Communication Proxy (SCP) proxies discovery and other traffic between NFs. Based on delays, timeouts, dropped messages, or other traffic characteristics, the SCP can determine that a particular NF is running at zero or reduced capability. The SCP can then cause traffic to be redirected to other NFs. In some examples, the SCP transparently redirects the traffic without the knowledge of the NRF, e.g., serving as a back-to-back proxy. In other examples, the SCP updates the NRF so that new discovery requests will be fulfilled by NFs running at higher capacity than the particular NF. This can reduce the incidence of overload-triggered failures, which can improve network reliability.

Some networks use a Service-Based Architecture (SBA) configuration in which NFs intercommunicate specialized messages via a common protocol (e.g., HTTPS). The term "SBA bus" refers to the set of link(s) via which that intercommunication can take place. An SBA bus can be implemented using bus topologies, e.g., Ethernet, PCI, or other buses. An SBA bus can additionally or alternatively be implemented using point-to-point links between NFs. Accordingly, "SBA bus" as used herein for brevity permits, but does not require, a bus topology of physical connections. In some examples, an SCP can be a Service Proxy Function (SPF) or other network node serving as a point of interconnection between at least two NFs. In some examples, an SCP can be attached to an SBA bus and be available to provide service to multiple NFs.

Various examples manipulate interactions, e.g., lookups for NF addresses or other discovery or service requests (e.g., over an SBA bus), to yield a desired result that is other than the routine and conventional sequence of events. In some prior schemes, when a provider NF's capability was reduced, consumer NFs would continue to attempt communication with that provider NF and experience downgraded service. Various examples herein handle NF service degradation by redirecting existing traffic or reducing the amount of incoming new traffic to a provider NF. In some examples, a consumer NF connects only with the core network device (e.g., an SCP), and never communicates directly with the provider NF. Various examples distribute the load of registrations. Various examples of claim 1 reduce the negative effects of network-function overload and increase network robustness.

Throughout this discussion, references to a single NF or NRF also encompass multiple NFs or NRFs arranged so that one of the NFs or NRFs is active and the other(s) is (are) hot spares or other standby/backup nodes. In some examples, synchronization protocols such as rsync are used between active and standby nodes.

Example embodiments described or shown herein are provided for purposes of example only. Statements made herein may be specific to a particular example embodiment (e.g., "use case"), or a specific aspect of that example embodiment, and should not be construed as limiting other example embodiments described herein. Features described with regard to one type of example embodiment may be applicable to other types of example embodiments as well. The features discussed herein are not limited to the specific usage scenarios with respect to which they are discussed. Subsection headers in this Detailed Description are solely for convenience in reading. Some examples include features from only one subsection. Some examples include features from more than one subsection.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art.

Some example systems and techniques described herein can permit computing devices to communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein.

ILLUSTRATIVE EXAMPLES

FIG. 1 shows an example telecommunication system 100 and messages according to various examples. In the illustrated example, telecommunication system 100 has a star topology, and SCP 102 routes at least some traffic between network nodes. The illustrated nodes are an NRF 104, an SMF 106, an AMF 108, a UDM 110, and two CHFs 112, 114. For brevity, FIG. 1 presents an example in which SMF 106 is a consumer NF 116 and CHFs 112, 114 are provider NFs 118. Techniques described herein can additionally or alternatively be used for communication between other types of NFs.

NRF 104 receives a registration message from a provider NF 118, e.g., a CHF or a UDM, via SCP 102. In the illustrated example, NRF 104 receives registration message #1 from first CHF 112 and registration message #2 from second CHF 114, e.g., directly or via SCP 102 (dotted lines). The registration messages #1, #2 can be, e.g., 5G Nnrf_NFManagement_NFRegister messages (ETSI TS 129 510 v15.1.0 § 5.2.2.2) indicating that the respective provider NF 118 is available to provide services to other NFs. In some examples, a provider NF 118 (or other NFs described herein) is configured to register to multiple NRFs. In some examples, provider NF 118 (or other NFs described herein) is statically configured with a network hostname or address of SCP 102 or NRF 104 so that provider NF 118 can announce its availability to provide services. In some examples, SCP 102 serves as a router, switch, proxy (e.g., HTTP or HTTPS proxy), or B2BUA that receives traffic addressed to NRF 104 and forwards it.

A consumer NF 116 can be an NF, e.g., an AMF, SMF, or PCF, that needs to access services provided by provider NF 118. Consumer NF 116 can be a regional NF, in some examples. Consumer NF 116 can send a discovery query ("DQuery") #3 to NRF 104, e.g., directly or (as shown) via SCP 102. Query #3 can be, e.g., a 5G Nnrf NFDiscovery Request message (129 510 § 5.3.2.2). Query #3 can specify a network-function type (referred to for brevity as an "NFType") indicating the type of NF sought. NFTypes can be string values, e.g., "CHF" or "5G EIR". In some examples, NFTypes defined in 129 510 Table 6.1.6.3.3-1 (referred to at id, Table 6.2.6.1-2) are used. Additionally or alternatively, query #3 can include a DNS request for SRV/NAPTR record(s), an X.500/LDAP request, or another discovery query. Accordingly, load-balancing and query-management techniques described herein can be used with DNS, X.500, or other registration or discovery systems in addition to or instead of 5G discovery systems.

In the illustrated example, SCP 102 forwards discovery query #3 to NRF 104 as discovery query #4. In some examples of roaming, transfers such as FIGS. 1 #3 and #4 and FIG. 2 #3 pass through one or more Security Edge Protection Proxies (SEPPs), e.g., one on the edge of each roaming partner. NRF 104 determines a discovery response ("DResp"). For example, NRF 104 can run an SQL SELECT or other database query to return any registration records for which the respective NFType matches (e.g., by string equality) the NFType in discovery query #4. NRF 104 can then send the discovery response as discovery response #5 to SCP 102. Discovery response #5 can be a message carrying a network address or hostname, e.g., an HTTP 200 OK response to an Nnrf_NFDiscovery_NFDiscover request. SCP 102 forwards discovery response #5 to consumer NF 116 as discovery response #6. Consumer NF 116 can then request services from the NF indicated in discovery response #6.

In the illustrated example, consumer NF 116 sends a service request ("SReq") #7 to a provider NF 118 via SCP 102. SCP 102 forwards service request #7 to provider NF 118 (in this example, first CHF 112) as service request #8. Provider NF 118 responds with service response ("SResp") #9. SCP 102 forwards service response #9 to consumer NF 116 as service response #10.

In some examples, SCP 102 can send information (report #11) to NRF 104 regarding the status of provider NF(s) 118. For example, SCP 102 can cause NRF 104 to remove or adjust registration information for provider NF(s) 118 that are unavailable, overloaded, or for whatever reason not satisfying response criteria. In some examples, SCP 102 can cause NRF 104 to adjust an NFProfile.priority value (129 510 Table 6.1.6.2.2-1), e.g., to increase the priority value (decrease the priority) of a provider NF 118 that is responding with errors, responding intermittently, responding late, not responding, or otherwise not satisfying stored reply criteria.

Some examples herein include fewer than all of the illustrated devices, or include other devices not shown. For example, a system can include only one CHF and multiple UDMs. In some examples herein, e.g., serving roaming terminals, at least provider NF 118 (e.g., an SMF or a UPF) can interact with an NRF 104 in a home network, an NRF in a visited network, or both.

Figure 2:
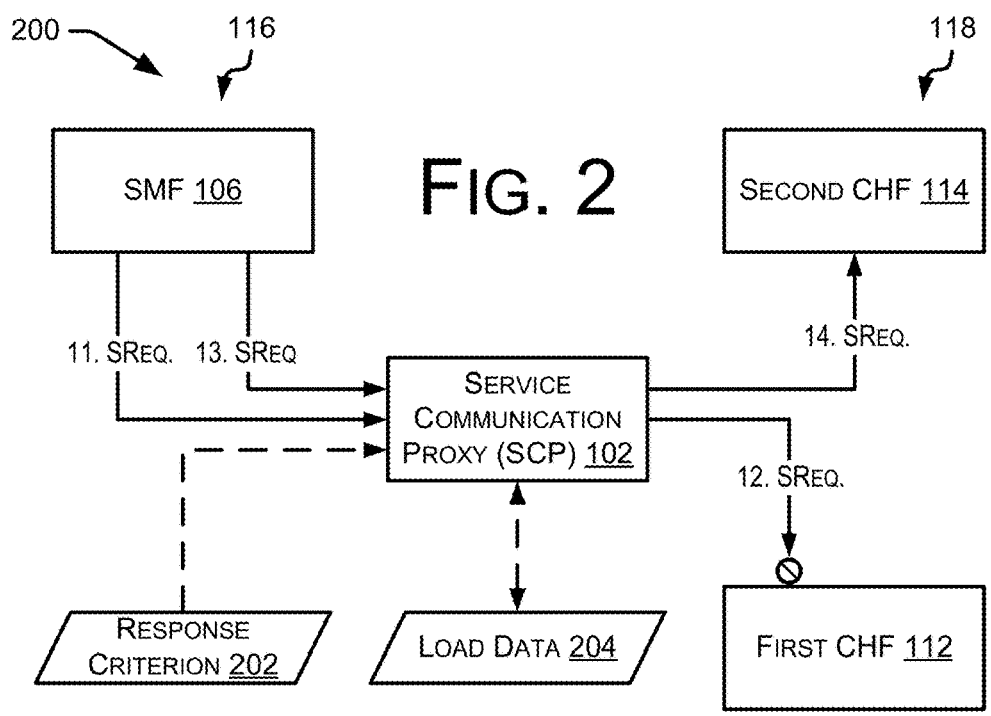
FIG. 2 shows an example network system and messages according to various examples in which communication with a provider NF is interrupted.

FIG. 2 shows an example telecommunication scenario 200 according to various examples. In scenario 200, first CHF 112, serving as provider NF 118, has become inaccessible. Consumer NF 116 sends service request #11 to SCP 102, which forwards corresponding service request #12 to first CHF 112. However, in this example, as indicated by the "no" sign, service request #12 does not reach first CHF 112.

After forwarding service request #12, SCP 102 determines that first CHF 112 has violated a predetermined response criterion 202, e.g., has not responded within a timeout, or has not responded in a way that satisfies response-time limits. SCP 102 can record an indication of the violation, e.g., in a computer-readable memory. For example, SCP 102 can update load data 204 stored in the computer-readable memory to record the indication.

Subsequently, SCP 102 can receive another service request #13 from consumer NF 116. In response to the recorded indication (e.g., in load data 204), SCP 102 can forward service request #13 to a different provider NF 118. In this example, SCP 102 forwards service request #13 to second CHF 114 as service request #14. This can provide transparent fallback for NF services when a provider NF 118 experiences a capacity reduction. In some examples, corresponding techniques can be used for discovery requests to provide transparent fallback when an NRF 104 of a plurality of NRFs experiences a capacity reduction.

In some examples, when first CHF 112 is approaching overload, SCP 102 can redirect at least some CHF traffic to second CHF 114. In another example, when a first UPF is approaching overload, SCP 102 can direct SMF 106 to send some traffic to a second UPF, or can itself send some traffic (e.g., signaling traffic) to the second UPF.

Some examples of systems such as those depicted in FIGS. 1 and 2 use caching, e.g., of registration information at NRF(s) 104 or other registry devices. For example, registration information can be cached until a time-to-live (TTL) expires, e.g., a TTL of 3600 s. In some examples of systems such as those depicted in FIGS. 1 and 2, provider NF(s) 118 periodically exchange heartbeat packets with NRF(s) 104. If an NRF 104 becomes inaccessible to a provider NF 118, that provider NF 118 can register with a different NRF 104. If a provider NF 118 becomes inaccessible to an NRF 104, that NRF 104 can mark that provider NF's registration as suspended, or can remove or revoke the registration. The registration can be returned to pre-outage status once heartbeat packets are once again successfully exchanged.

Figure 3:
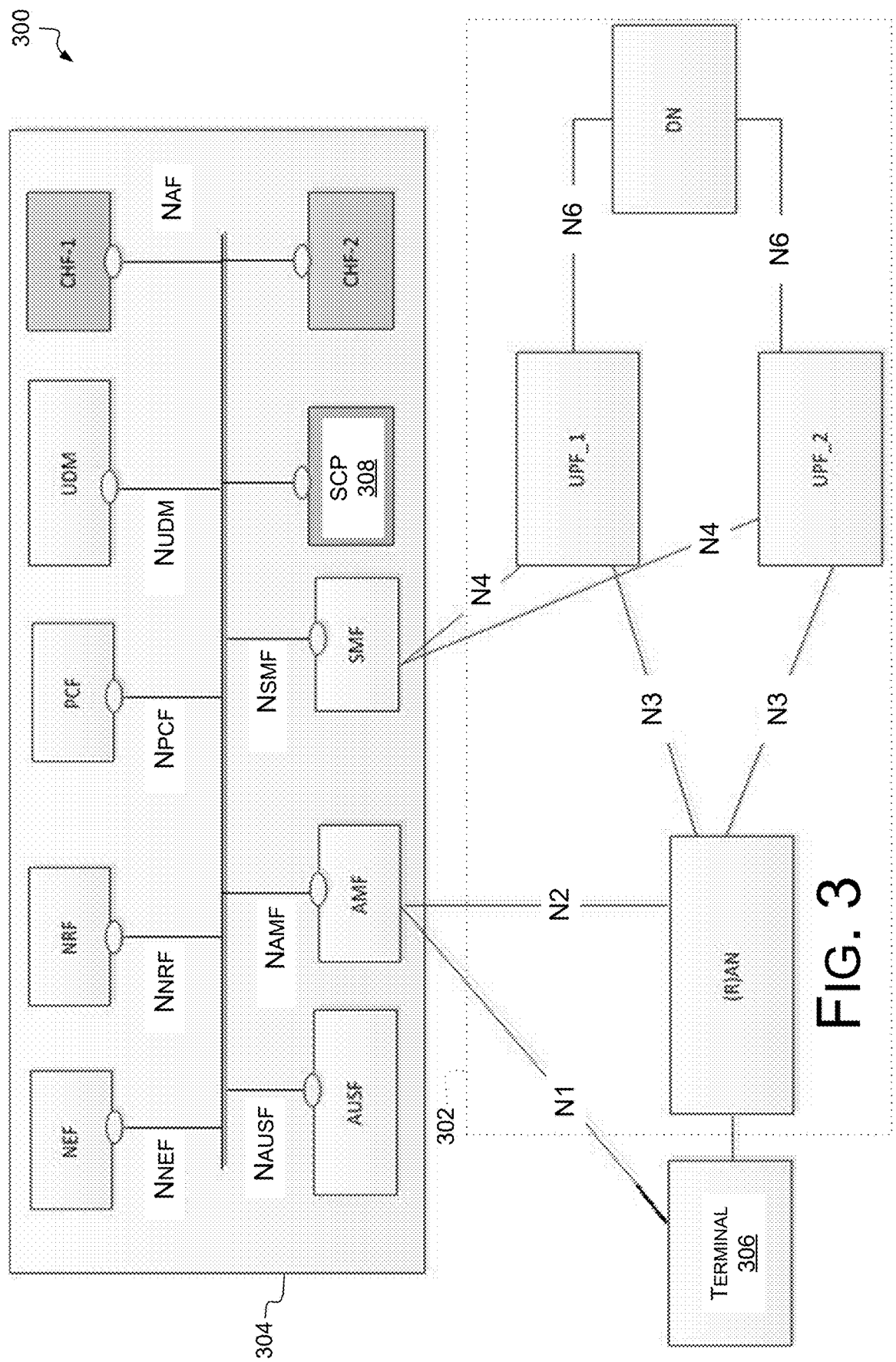
FIG. 3 shows an example access network and an example core network.

FIG. 3 shows an example telecommunications network 300 including an access network 302 and a core network 304. Terminal 306 communicates with access network 302 and core network 304 to obtain network services. Network 300 shows example components of a 5G NR cellular network. Core network 304 implements a service-based architecture, in which NF "X" provides interface "Nx" to other NFs. The SBA is depicted as a bus; however, in some examples, all traffic between NFs on the SBA bus passes through SCP 308 (which can represent SCP 102), e.g., operating as a proxy or B2BUA. In some examples, SBA-bus traffic is carried in HTTPS messages transmitted via SCP 308 serving as an HTTP/HTTPS proxy.

Illustrative Computing System(S)

Figure 4:
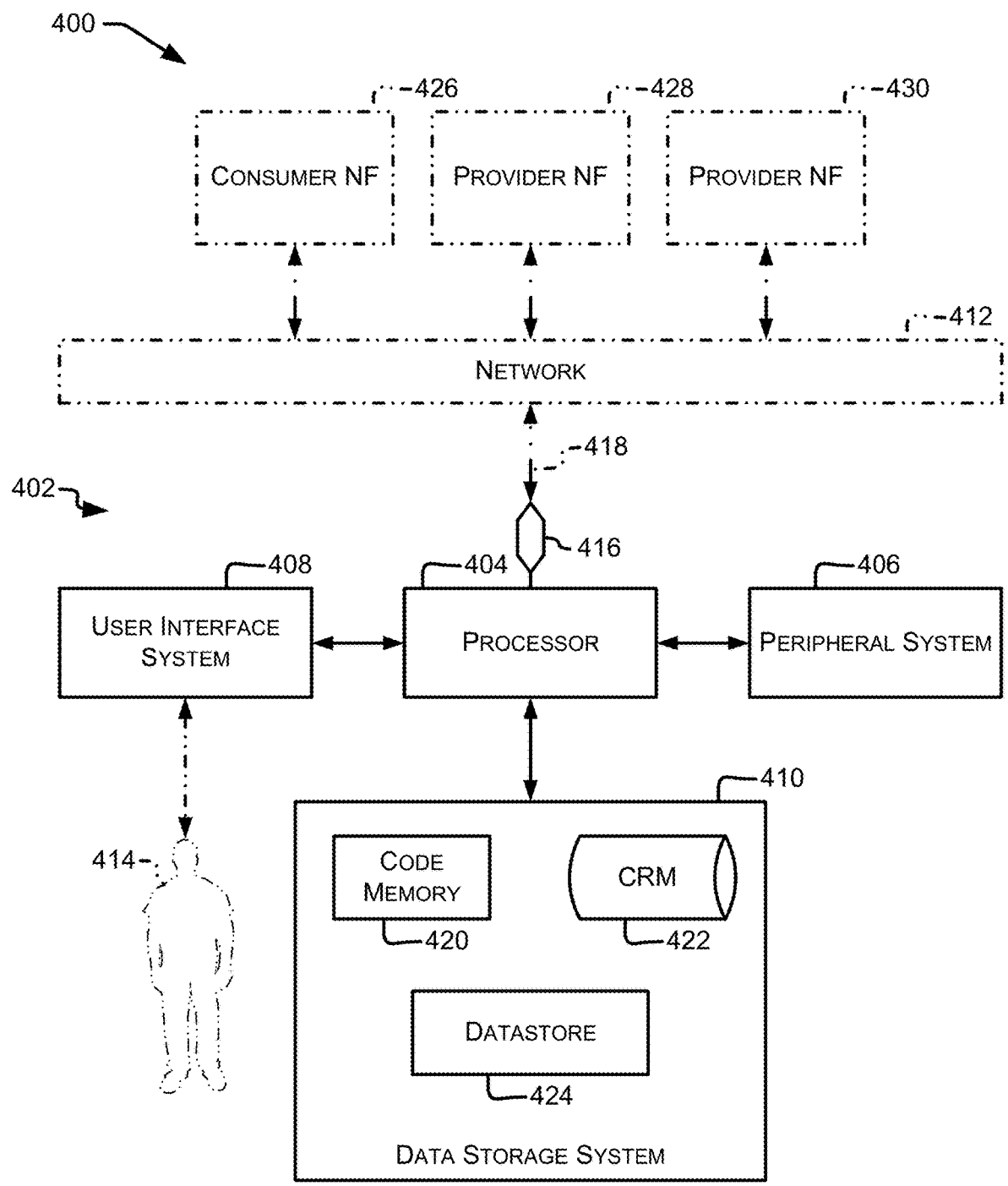
FIG. 4 is a high-level diagram showing the components of a computing system.

FIG. 4 is a high-level diagram 400 showing the components of an example computing system 402 for analyzing data and performing other analyses described herein, and related components. The system 402 includes a processor 404, a peripheral system 406, a user interface system 408, and a data storage system 410. The peripheral system 406, the user interface system 408, and the data storage system 410 are communicatively connected to the processor 404. Processor 404 can be communicatively connected to network 412 (shown in phantom), e.g., the Internet, a leased line, or a cellular network, as discussed below. Network 412 can be an example of an internetwork, such as the public Internet or a private IPX network. Terminals, nodes of a serving network, nodes of a home network, NRF 104, NFs 116, 118, or other network nodes described herein can each include one or more of subsystems 404, 406, 408, 410, and can each connect to one or more network(s) 412. Processor 404, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Telecommunications networks, such as network 412 or a component thereof, may include an application network (e.g., an Internet Protocol, IP, Multimedia Subsystem, IMS, network) or a core network (e.g., a 5G core) operated by one or more service providers ("carriers"), such as one or more cellular-telephony providers. The application network can be connected via access networks, e.g., a serving network or a home network, to terminals. Terminals can be operated by users ("subscribers"), or can be autonomous. Example access networks carrying traffic of sessions can implement GSM or other second-generation (2G) cellular technologies; Universal Mobile Telecommunications System (UMTS) or other third-generation (3G) cellular technologies; Long Term Evolution (LTE) or other fourth-generation (4G) cellular technologies; or fifth-generation (5G) New Radio (NR) cellular technologies. Some examples can include or be interoperable with LTE or NR cellular networks, or any future IP-based cellular networks, e.g., carrying Voice over LTE (VoLTE) or Voice over NR (VoNR) sessions using Session Initiation Protocol (SIP) signaling.

Other example access networks can implement wired data-network technologies such as Ethernet, Asynchronous Transfer Mode (ATM), Data Over Cable Service Interface Specification (DOCSIS), digital subscriber line (DSL), or optical networks (e.g., Synchronous Optical NETwork, SONET); wired telephony networks such as Signaling System 7 (SS7) or other Public Switched Telephone Network (PSTN) technologies, or wireless data networks such as Institute of Electrical and Electronics Engineers (IEEE) 802.11 (WIFI), 802.15.1 (BLUETOOTH), or 802.16 (WIMAX) networks carrying voice over Internet Protocol (VoIP) (e.g., VoWIFI) calls.

In some examples, the network 412 can provide wide-area wireless coverage using a cellular-network technologies such as Code Division Multiple Access (CDMA), Time Division Multiple Access (TDMA), Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE RAN (GERAN), Universal Terrestrial RAN (UTRAN), or evolved UMTS Terrestrial RAN (E UTRAN).

Processor 404 can implement techniques according to various aspects described herein. Processor 404 and related components can, e.g., carry out techniques for detecting overload or other negative operational conditions, detecting violations of response criteria, redirecting traffic, proxying or forwarding traffic, or performing other functions described herein.

Processor 404 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 406, user interface system 408, and data storage system 410 are shown separately from the processor 404 but can be stored completely or partially within the processor 404.

The peripheral system 406 can include or be communicatively connected with one or more devices configured or otherwise adapted to provide digital content records to the processor 404 or to take action in response to processor 404. For example, the peripheral system 406 can include digital still cameras, digital video cameras, cellular phones, or other data processors. The processor 404, upon receipt of digital content records from a device in the peripheral system 406, can store such digital content records in the data storage system 410.

The user interface system 408 can convey information in either direction, or in both directions, between a user 414 (shown in phantom) and the processor 404 or other components of system 402. The user interface system 408 can include a mouse, a keyboard, another computer (connected, e.g., via a network or a null-modem cable), or any device or combination of devices from which data is input to the processor 404. The user interface system 408 also can include a display device, a processor-accessible memory, or any device or combination of devices to which data is output by the processor 404. The user interface system 408 and the data storage system 410 can share a processor-accessible memory.

In various aspects, processor 404 includes or is connected to network interface 416 that is coupled via network link 418 (shown in phantom) to network 412. Network link 418 can include a wired or wireless communication connection. For example, network interface 416 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Network interface 416 sends and receives electrical, electromagnetic, or optical signals that carry digital or analog data streams representing various types of information across network link 418 to network 412. Network link 418 can be connected to network 412 via a switch, gateway, hub, router, or other networking device.

Processor 404 can send messages and receive data, including program code, through network 412, network link 418, and network interface 416. For example, a server can store requested code for an application program (e.g., a JAVA applet) on a tangible non-volatile computer-readable storage medium to which it is connected. The server can retrieve the code from the medium and transmit it through network 412 to network interface 416. The received code can be executed by processor 404 as it is received, or stored in data storage system 410 for later execution.

Data storage system 410 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 404 can transfer data (using appropriate components of peripheral system 406), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 410 can be a tangible non-transitory computer-readable storage medium, i.e., a non-transitory device or article of manufacture that participates in storing instructions that can be provided to processor 404 for execution. In some examples, one of the processor-accessible memories in the data storage system 410 can be a non-volatile memory in a Subscriber Identity Module (SIM) card.

In an example, data storage system 410 includes code memory 420, e.g., a random-access memory (RAM), and computer-readable medium (CRM) 422, e.g., a tangible computer-readable medium (e.g., a hard drive or other rotational storage device, or a Flash drive or other nonvolatile storage device). Computer program instructions are read into code memory 420 from CRM 422. Processor 404 then executes one or more sequences of the computer program instructions loaded into code memory 420, as a result performing process steps described herein. In this way, processor 404 carries out a computer implemented process. For example, steps of methods described herein, blocks of the flowchart illustrations or block diagrams herein, and combinations of those, can be implemented by computer program instructions. Code memory 420 can also store data, or can store only code. In some examples, e.g., using high-speed nonvolatile memory, CRM 422 also functions as code memory 420, and a separate code memory 420 is not used.

In the illustrated example, data storage system 410 includes a datastore 424. Datastore 424 can be, include, or be embodied in a dedicated memory, or a portion of another memory (e.g., CRM 422). Datastore 424 can include, e.g., an SQL, NoSQL, flat-file, or other database; an associative array; or another data-storage subsystem or structure configured for storing information described herein. Such information can include information of NFs, e.g., network addresses and NFTypes. Additionally or alternatively, such information can include information related to response criteria (such as response criterion 202) or to compliance by provider NFs 118 with such criteria (e.g., load data 204). Examples are discussed herein, e.g., with reference to FIGS. 2 and 5. Processor 404 can update information in datastore 424, e.g., in response to registration messages such as FIG. 1 #1, #2; service requests such as FIG. 2 #12; service responses such as FIG. 1 #9; or failures to respond to service requests, e.g., as shown in FIG. 2.

A network address can include a string fully-qualified domain name (FQDN) or other hostname, or an IPv4, IPv6, or other network address represented, e.g., in binary or string form. For example, the IPv4 loopback can be represented in binary form as 0x7f000001 or in string form as "127.0.0.1". An NFType can include a string, e.g., "UDM".

In various aspects, system 402 can communicate, e.g., via network 412, with one or more additional data processing system(s). Shown in phantom are a consumer NF 426, a provider NF 428, and a provider NF 430. Each of systems 426, 428, 430 can include the same types of components as system 402 but is not required to be identical thereto. Systems 402, 426, 428, or 430 can be communicatively connected via the network 412. Each system 402, 426, 428, or 430 can execute computer program instructions to perform operations described herein. For example, system 402 can represent SCP 102 (e.g., an SPF or SBA bus), system 426 can represent a consumer NF 116 requesting network services, system 428 can represent a provider NF 118 (e.g., first CHF 112) registering to the NRF, and system 430 can represent a provider NF 118 (e.g., second CHF 114) registering to the NRF. Each system 402, 426, 428, 430 can execute computer program instructions to conduct at least a portion of at least one exchange described herein with reference to FIG. 1, 2, or 5-12. In some examples, system 402 can be collocated with at least one of systems 426, 428, or 430.

In the illustrated example, any of systems 402, 426, 428, or 430 can be implemented using computing node(s) in a cluster computing system, e.g., a cloud service or other cluster system ("computing cluster" or "cluster") having several discrete computing nodes that work together to accomplish a computing task assigned to the cluster as a whole. In some examples, at least one of systems 402, 426, 428, or 430 can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least one of systems 402, 426, 428, or 430 can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, RAM space, network bandwidth (uplink, downlink, or both), prioritized network channels such as those used for communications with quality-of-service (QoS) guarantees, backup tape space and/or mounting/unmounting services, electrical power, etc.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 404 (and possibly also other processors), and that, when loaded into processor 404, cause functions, acts, or operational steps of various aspects herein to be performed by processor 404 (or other processor). Computer program code for carrying out operations for various aspects described herein may be written in any combination of one or more programming language(s), and can be loaded from CRM 422 into code memory 420 for execution. The program code may execute, e.g., entirely on processor 404, partly on processor 404 and partly on a remote computer connected to network 412, or entirely on the remote computer.

In some examples, a "control unit" as described herein includes processor 404. A control unit can also include, if required, data storage system 410 or portions thereof. For example, a control unit can include a CPU or DSP (processor 404), and can include a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically or via blown fuses or logic-cell configuration data) to perform functions described herein. In some example of control units including ASICs or other devices physically configured to perform operations described herein, a control unit does not include computer-readable media (e.g., CRM 422) storing processor-executable instructions.

Illustrative Operations

Figure 5:
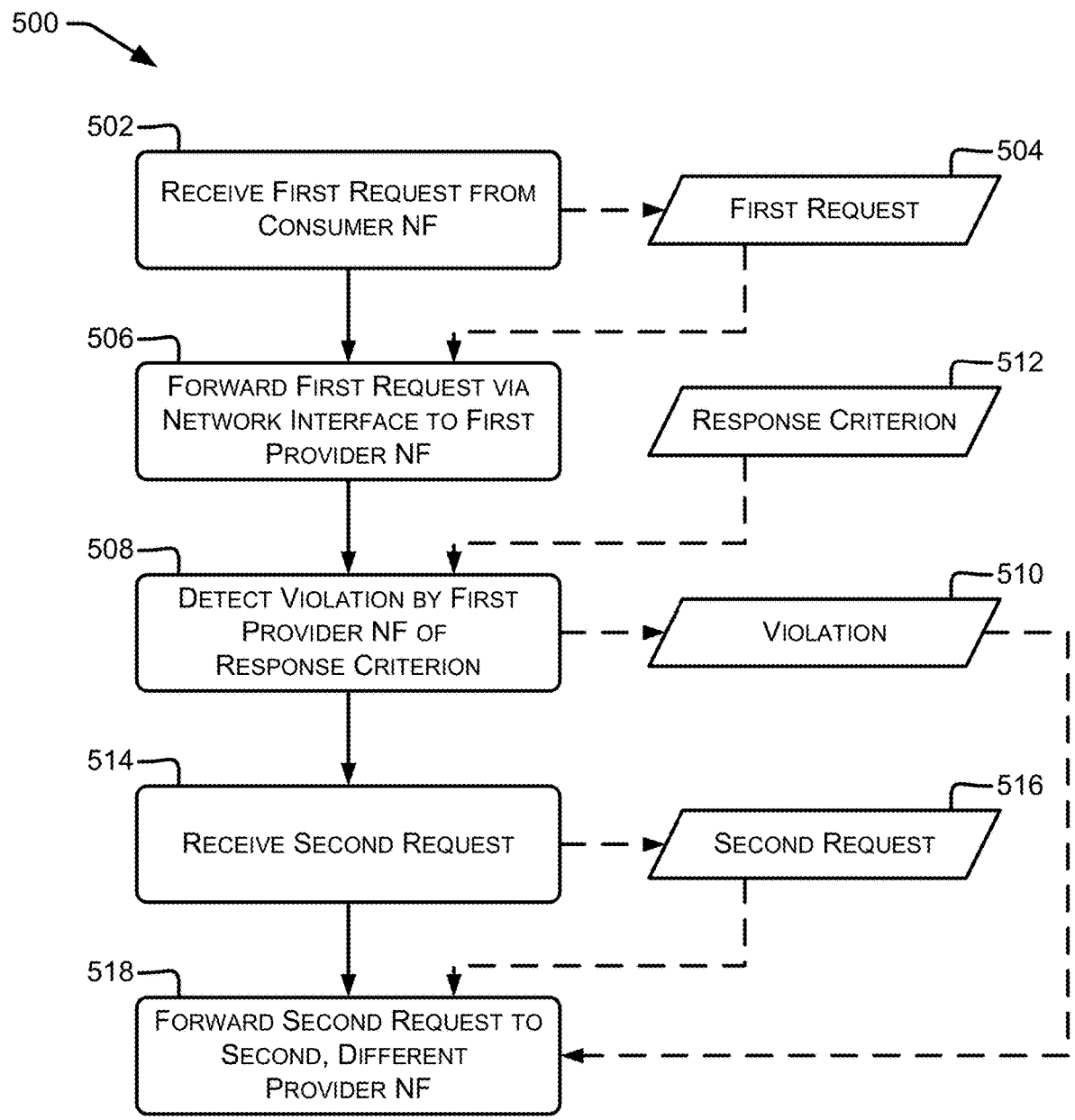
FIG. 5 is a dataflow diagram illustrating an example technique (e.g., at a core network device) for monitoring a provider NF and forwarding network requests, and related data items, according to various examples.

FIG. 5 is a dataflow diagram illustrating an example technique 500 for monitoring a provider NF and forwarding network requests, and related data items. For clarity, dataflow is shown dashed throughout FIGS. 5-12. Technique 500 can be performed, e.g., by a core network device such as an SCP 102 of a telecommunication system 100. The core network device can include network interface 416 and datastore 424, e.g., held in CRM 422 or other component of data-storage system 410. The core network device can include at least one processor 404 and at least one code memory 420, or another control unit, configured to perform operations of technique 500, e.g., in response to computer program instructions.

Operations shown in FIG. 5 and in FIGS. 6-12, discussed below, can be performed in any order except when otherwise specified, or when data from an earlier step is used in a later step. For clarity of explanation, reference is herein made to various components shown in FIGS. 1-4 that can carry out or participate in the steps of the example methods. It should be noted, however, that other components can be used; that is, example method(s) shown in FIGS. 5-12 are not limited to being carried out by the identified components, and are not limited to including the identified operations or messages.

Some operations herein are mutually independent, i.e., neither requires as input any output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

At 502, the control unit can receive, via network interface 416, a first request 504 from a consumer NF 116. Examples are discussed herein, e.g., with reference to FIG. 1 #3, #7, and FIG. 2 #11. First request 504 can include a discovery request or service request. In some examples, first request 504 can be a stateless request, e.g., a request for which no state need be retained in association with the request once a response has been sent.

In some examples, first request 504 can include an initial request or an update request. An initial request can request for initialization of state data. For example, an initial request, e.g., an Nnrf_NFManagement_NFStatusSubscribe request, can request establishment of a new subscription in order to receive push notifications. The subscribing network device, and subscription criteria, can be stored in datastore 424 or another repository of state data. An update request can request modification of the state data. For example, an update request, e.g., an Nnrf_NFManagement_NFStatusUnSubscribe request, can request modification or termination of a subscription. Additionally or alternatively, an initial request such as an Nnrf_NFManagement_NFRegister request can provide information about a requesting NF to a provider NF 118, and an update request such as an Nnrf_NFManagement_NFUpdate request can change or remove corresponding information as stored at the provider NF 118.

At 506, the control unit can forward the first request 504 via network interface 416 to a first provider NF 118. Examples are discussed herein, e.g., with reference to FIG. 1 #4, #8, and FIG. 2 #12.

At 508, the control unit can detect a violation 510 by the first provider NF of a predetermined response criterion 512 (which can represent response criterion 202) with respect to the first request. Operation 508 can be performed at a time after forwarding the first request 504 (operation 506). Examples are discussed herein, e.g., with reference to FIG. 2 #12. In the example of FIG. 2, first CHF 112 violates criterion 512 by not responding, since first CHF 112 does not receive request #12. Operation 508 can include storing an indication of violation 510 in load data 204 or datastore 424.

In some examples, the first provider NF 118 violates criterion 512 by timing out at more than a certain average rate stored in criterion 512. The timeout period is a configurable parameter, for which different operators can use different values based on their design and NW latency, for example, it can be 3, 6, 9 second or even more. Various examples of violation 510 are discussed herein, e.g., with reference to FIGS. 6 and 8. In some examples, the control unit (e.g., of SCP 102) can apply criteria 512 that apply to interactions with multiple clients. This can permit SCP 102 to detect violations 510 that an individual client of first provider NF 118 would not be able to detect.

At 514, the control unit can receive, via the network interface 416, a second request 516. Examples are discussed herein, e.g., with reference to FIG. 1 #7, FIG. 2 #13, and operation 502.

At 518, the control unit can forward the second request 516 to a second provider NF 118 different from the first provider NF 118 at least partly in response to the violation 510. Examples are discussed herein, e.g., with reference to FIG. 2 #14. Responding to violation 510 by forwarding subsequent requests to a different provider NF 118 can reduce the probability that a request will go unserviced, and can permit the first provider NF 118 to complete processing of existing requests and thereby increase its capacity.

In some examples, operation 518 can include (or be preceded by an operation of) selecting the second provider NF 118. Various examples of implementations using load data 204 are described below with reference to load data 708, FIG. 7. In some examples, operation 518 can include selecting (e.g., by random, round-robin, or other techniques) a second provider NF 118 that is, at the time of selection, in compliance with criterion 512, or another criterion. Some examples use a different criterion for selecting second provider NF 118. This can, e.g., provide hysteresis and prevent frequent back-and-forth changes in the routing of requests to provider NFs 118.

Figure 6:
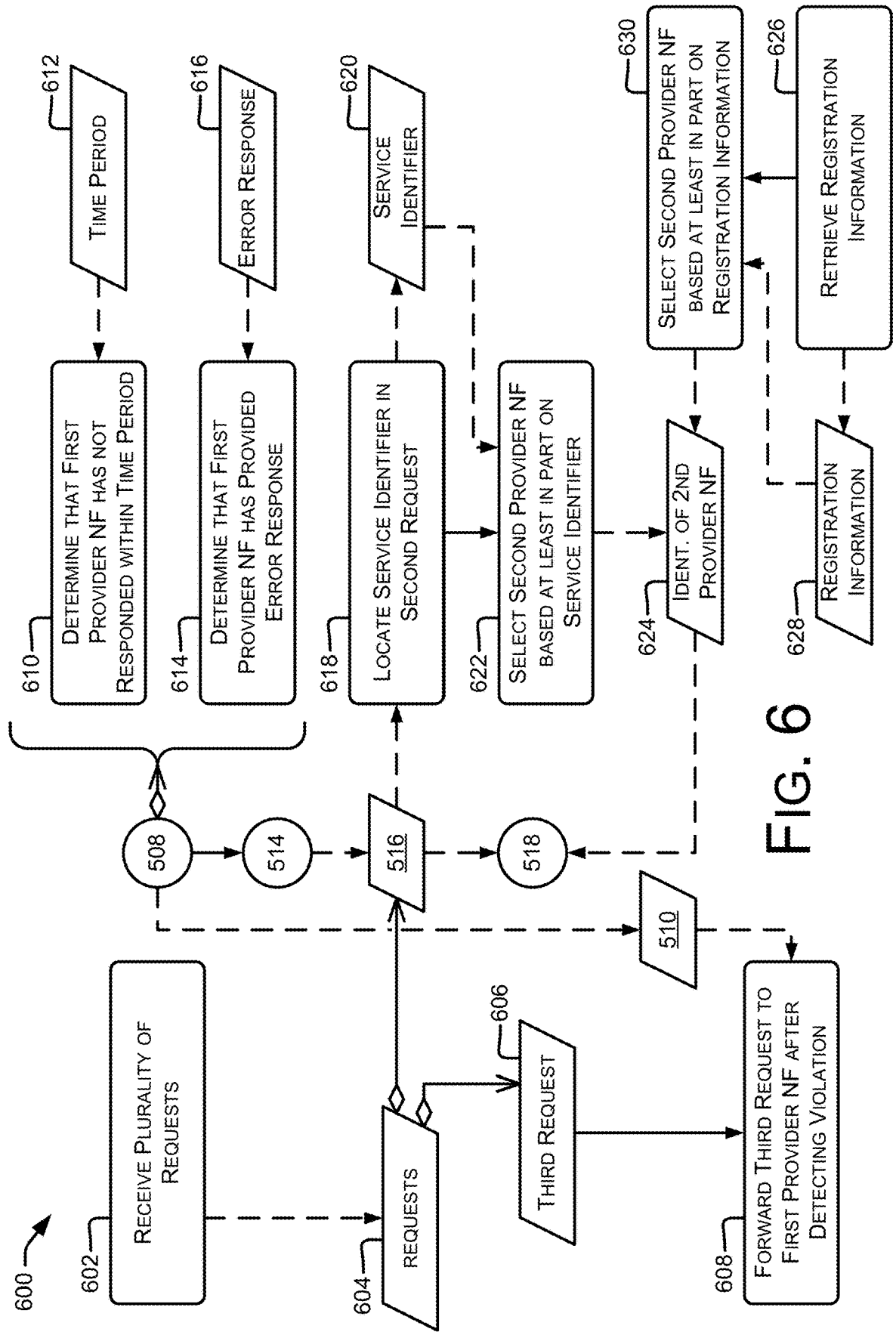
FIG. 6 is a dataflow diagram illustrating example techniques for monitoring a provider NF and forwarding network requests, and related data items, according to various examples.

FIG. 6 is a dataflow diagram that illustrates example techniques 600 for monitoring provider NFs or processing network requests, and related dataflow (shown dashed for clarity). In some examples, techniques 600 can be performed by a control unit, as described herein, e.g., of a computing system 402. In some examples, at least: operation 508 can include operation 610 or operation 614; or at least one of operations 622 and 630 can be performed before operation 518.

Some examples include load-balancing between the first provider NF 118 and the second provider NF 118. Some of these examples include operations 602 and 608.

At 602, the control unit can receive, via the network interface, a plurality of requests 604. The plurality of requests 604 can include the second request 516 and a third request 606. Operation 602 can be carried out over time, e.g., by receiving one or more of the requests 604 at a first time and one or more of the requests 604 at a second, different time.

At 608, the control unit can forward the third request to the first provider NF 118 after detecting the violation 510 by the first provider NF 118. For example, a delayed response by first provider NF 118 may indicate overload on the part of first provider NF 118. The control unit can reduce the proportion of requests that are forwarded to first provider NF 118, but not discontinue forwarding requests to first provider NF 118. (In other examples, the control unit can discontinue forwarding requests to first provider NF 118.)

In some examples, first and second provider NFs 118 can share state, e.g., by connecting to a common database or otherwise sharing a datastore. In some of these examples, multiple requests in a particular conversation (e.g., initial and update requests) can be processed by different provider NFs 118. This can increase robustness and reduce the probability that a terminal will experience service degradation due to provider-NF migration. In some examples, accordingly, first request 504 comprises an initial request for initialization of state data (e.g., subscription data). An initial request can be, e.g., a subscription request, or another request that creates state data at first provider NF 118, e.g., an Nnrf_NFManagement_NFStatusSubscribe request. Second request 516 comprises an update request for modification of the state data, e.g., an Nnrf_NFManagement_NFStatusUnSubscribe request.

Some examples relate to detecting violation 510 in various ways. Some of these examples include at least one of operations 610 and 614.

At 610, the control unit can detect violation 510 at least partly by determining that the first provider NF 118 has not provided a response to the first request 504 within a predetermined time period 612 after the forwarding of the first request 504. Operation 610 can permit detecting, e.g., situations in which first provider NF 118 is down or is no longer reachable via the network from the control unit, or in which first provider NF 118 is too heavily loaded to meet its service requirements.

At 614, the control unit can detect violation 510 at least partly by determining that the first provider NF 118 has provided an error response 616 to the first request 504. Error response 616 can include, e.g., a Request Timeout (e.g., 408), Internal Server Error (e.g., 500), Service Unavailable (e.g., 503), or Gateway Timeout (e.g., 504) response. Operation 614 can permit detecting, e.g., situations in which first provider NF 118 is reachable but not able to process requests, e.g., due to overload or error. A threshold for the error response may also be a configurable parameter based on the operator and be set to 10%, 20% or higher, and detecting a large number of errors in a short period of time would be a concern.

In some examples, SCP 102 serves as a proxy for requests. Some of these examples include operations 618 and 622.

At 618, the control unit can locate a service identifier 620 in the second request 516. Service identifier 620 can include, e.g., the value of an HTTP Host header, or another header or body value (e.g., a value in a JSON body). Service identifier 620 can indicate which NF or other network service is associated with second request 516. Operation 618 can include selecting less than all of a header or body value. For example, if second request 516 includes the header "Host: chf.5g-core.example.net", the control unit can extract the leftmost subdomain in the Host value, in this example "chf". Operation 618 can additionally or alternatively include transforming data to provide service identifier 620, e.g., by upper- or lower-casing, folding case, or otherwise normalizing case; trimming whitespace; or applying a transliteration or regular-expression substitution.

At 622, the control unit can select the second provider NF 118 based at least in part on the service identifier 620. Operation 622 can include determining an identification 624 of the second provider NF 118. For example, if second request 516 includes the header "Host: chf.5g-core.example-.net", the control unit can determine identification 624 including a network address of second CHF 114 or other second provider NF 118. Operation 622 can include looking up address(es) or other identification information of candidate provider NFs 118 in a lookup table or other datastore indexed by service identifier 620 or a representation thereof (e.g., a string such as "chf", or an NFType defined in 129 510).

Some example use data from the NRF when routing traffic. Some of these examples use operations 626 and 630.

At 626, the control unit can retrieve, via the network interface from a network registry device (e.g., NRF 104), registration information 628. Registration information 628 can indicate, e.g., what provider NFs 118 are registered with the network registry device.

At 630, the control unit can select the second provider NF 118 (e.g., determine identification 624) based at least in part on the registration information 628. For example, the control unit can select another NF handling the same NFType(s) as first provider NF 118.

In some examples, the control unit can override terminal-specific NF assignments in case of overload, in order to maintain service. In these and some other examples, the first request 504 can be associated with a terminal 306. For example, first request 504 can include identification information such as an International Mobile Subscriber Identity (IMSI), a Mobile Subscriber International Subscriber Directory Number (MSISDN), a username, an e-mail address, a Subscriber Permanent Identifier (SUPI), a Permanent Equipment Identifier (PEI), or a 5G Globally Unique Temporary Identifier (5G-GUTI). The identification information can identify terminal 306 or a user associated therewith. The second request 516 can also be associated with the terminal 306.

The registration information 628 can specify that the terminal 306 is associated with the first provider NF 118. For example, the registration information 628 can include an NFProfile (129 510 § 5.2.2.2.2, § 6.1.6.2.2) specifying SUPI ranges (for UDR, UDM, or AUSF provider NFs), S-NSSAI (for UPF provider NFs), or other information that associates the corresponding first provider NF 118 with terminal 306. For example, a SUPI of a user associated with terminal 306 can be included in a SUPI range in an NFProfile of first provider NF 118. The registration information can specify that the terminal 306 is not associated with the second provider NF 118. For example, a SUPI range in an NFProfile of second provider NF 118 can exclude all SUPI(s) associated with terminal 306. Selecting second provider NF 118, even though second provider NF 118 would not normally be available to serve terminal 306, can permit responding to overload conditions, e.g., by sharing load across more NFs than might normally be available. This can reduce the time required for load at first provider NF 118 to return to normal levels.

Figure 7:
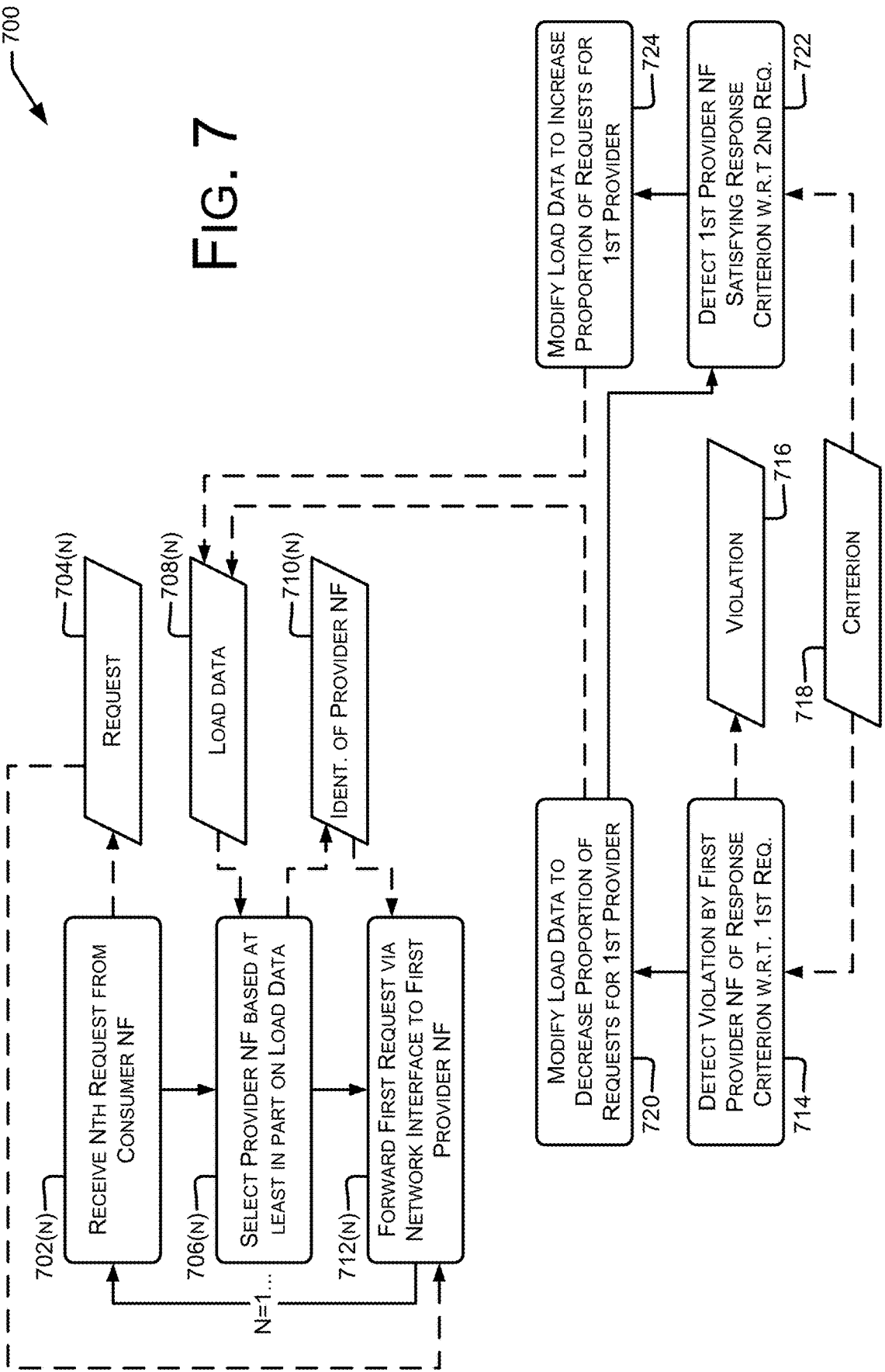
FIG. 7 is a dataflow diagram illustrating an example technique for processing requests for network service, and related data items, according to various examples.

FIG. 7 is a dataflow diagram that illustrates an example technique 700 for processing requests for network service, and related dataflow (shown dashed for clarity). Technique 700 can be performed by a control unit, e.g., as discussed herein with reference to FIG. 4. Technique 700 can be embodied in at least one tangible, non-transitory computer-readable medium comprising instructions that, when executed by one or more processors, cause the one or more processors to perform operations 702-712, 714-720, 722-724, or any combination of two or more of those groups of operations.

Technique 700 can permit dynamically adjusting the load to a provider NF 118. In some examples, SCP 102 relays messages between NFs and records information about the status of each provider NF 118, e.g., based on HTTP status codes from provider NF 118 (see, e.g., operation 816) or based on observed delay in signaling or communication (see, e.g., operation 812). Based on the recorded information, SCP 102 can send new requests to a different provider NF 118 configured to perform a requested function. In some examples, SCP 102 can gradually or step-wise reduce the volume of traffic forwarded towards the overloaded provider NF 118, and continue recording information about the status of the overloaded provider NF 118. For example, SCP 102 can reduce the volume of requests to provider NF 118 in one or more steps, each a reduction of, e.g., 5%, 10%, 25%, or another percentage with respect to the current or initial volume. SCP 102 can continue these step-by-step reductions until no requests are being sent, or until errors/timeouts are no longer observed.

Once provider NF 118 is no longer reporting errors, or triggering timeouts, SCP 102 can gradually increase traffic levels towards provider NF 118 can continue recording status information to monitor for overload indications (e.g., errors or timeouts). The volume of requests can be increased in one or more steps, each an increase of, e.g., 5%, 10%, 25%, or another percentage with respect to a current volume of requests to be served or to a design load of provider NF 118. In some examples, if no requests are being sent to provider NF 118, SCP 102 can begin ramping up load once it receives a heartbeat packet from provider NF 118, or after a predetermined cool-down time interval.

Operations 702-712 can be performed for each request of a plurality of requests. Accordingly, operations 702-712 are shown as a loop of operations 702($n$), 706($n$), and 712($n$) for the $n^{th}$ iteration of the loop ("n=1 . . ."). The illustrated loop processes one request per iteration; in some other examples, more than one request can be processed per iteration. Examples are discussed herein, e.g., with reference to operation 602.

At 702($n$), the control unit can receive, via a network interface, a request 704($n$) from a consumer NF 116. Examples are discussed herein, e.g., with reference to operations 502, 514, and 602.

At 706($n$), the control unit can select a respective provider NF of a plurality of provider NFs 118 based at least in part on load data 708($n$) (which can represent load data 204). Load data 708($n$) may be equal to or different from load data 708($n$−1), depending on the frequency of update of load data 708($n$) values and the timing of incoming requests 704($n$).

For example, the control unit can determine an identification 710($n$) of the respective provider NF 118. Examples are discussed herein, e.g., with reference to load data 204 and operations 508 and 518.

At 712($n$), the control unit can forward the request 704($n$) via the network interface 416 to the selected respective provider NF (identified by identification 710($n$)). Examples are discussed herein, e.g., with reference to operations 518 and 608.

In some examples, operations 714 and 720 can be performed in parallel, synchronized, or otherwise at partly concurrently with, the loop at operations 702-712. For example, operations 714 and 720 can be performed between operation 712($n$) and operation 702($n$+1). Operations 714 and 720 can update load data 708 to control the proportion of requests sent to a particular provider NF. Accordingly, operations 714 and 720 can be performed iteratively (looping omitted from the figure for brevity). In some examples, operations 714 and 720 are interrupt-triggered or are otherwise performed only as necessary. In various examples, operations 714 and 720 are performed more than once per iteration of operations 702-712; exactly once per such iteration; or less often than once per such iteration. Corresponding remarks apply to operations 722 and 724.

At 714, the control unit can detect, at a time after forwarding a first request 704($i$) of the plurality of requests 704, a violation 716 of a predetermined response criterion 718 with respect to the first request 704($i$) by a first provider NF 118 of a plurality of provider NFs. Examples are discussed herein, e.g., with reference to FIG. 2 #12 and operations 508, 610, and 614.

At 720, the control unit can modify the load data 708 to decrease the proportion of requests of the plurality of requests 704 subsequent to the first request 704($i$) for which the first provider NF 118 is selected. Examples are discussed herein, e.g., with reference to FIGS. 2 and 4 and operation 518. Operation 720 can be performed in response to the detection at operation 714 of violation 716. This can permit reducing the load on an overloaded or unreachable provider NF 118.

In some examples, the load data 708 can specify, or operation 706 can implement, load balancing by round-robin, weighted random selection, or another technique. Operation 720 can include adjusting load data 708 so that first provider NF 118 will be selected less often. For example, the control unit can add to load data 708 an indication that first provider NF 118 should be skipped every $k^{th}$ time it would otherwise be selected at operation 706($j$), j>i, e.g., k≥1. Additionally or alternatively, the control unit can adjust weights stored in load data 708 to reduce the probability that first provider NF 118 will be selected at operation 706($j$), j>i.

At 722, the control unit can detect that the first provider NF 118 has satisfied the predetermined response criterion 718 with respect to a second request 704($m$) of the plurality of requests, m>i. Operation 722 can be performed at a time after detecting the violation 716 of the predetermined response criterion 718. This can indicate, e.g., that first provider NF 118 has become reachable, or is recovering from an overload condition.

Examples of detecting failures are discussed herein, e.g., with reference to operations 610 and 614. Some examples of operation 722 include checks for opposite conditions. For example, operation 722 can include determining that a time of receipt of a response to second request 704($m$) was within a predetermined time period (e.g., time period 612). Additionally or alternatively, operation 722 can include determining that a received response was a success response, e.g., carrying a 1xx or 2xx response code (e.g., 200 OK).

At 724, the control unit can modify the load data 708 to increase the proportion of requests of the plurality of requests subsequent to the second request 704(*m*) for which the first provider NF 118 is selected. Operation 724 can be performed in response to the determination at operation 722. This can permit maintaining load balancing as first provider NF 118 increases its capacity to handle load. Examples of adjusting load data 708 are discussed herein, e.g., with reference to operation 720. For example, operation 724 can include decreasing the value of k (discussed above), removing k from the load data 708, or increasing a weight associated with first provider NF 118 in load data 708.

In some examples, an earlier request 704(*a*) of the plurality of requests comprises an initial request for initialization of state data (e.g., a subscription); and a later request 704(*b*), a<b, of the plurality of requests comprises an update request for modification of the state data (e.g., unsubscription). Examples are discussed herein, e.g., with reference to operation 502 and FIG. 6.

Figure 8:
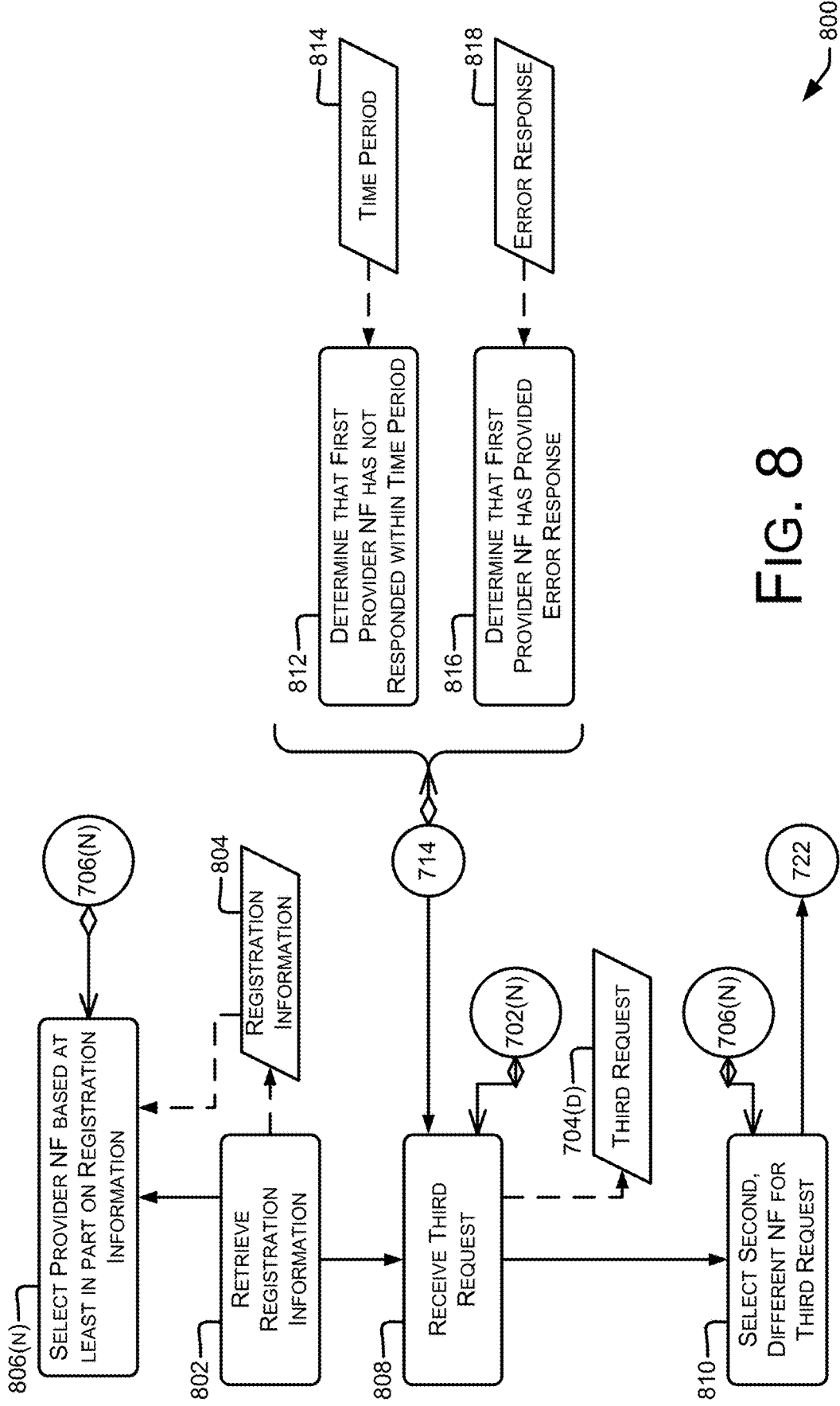
FIG. 8 is a dataflow diagram illustrating example techniques for managing network-service requests and network functions, and related data items, according to various examples.

FIG. 8 is a dataflow diagram that illustrates example techniques 800 for managing requests and NFs, and related dataflow (shown dashed for clarity). In some examples, techniques 800 can be performed by a control unit, as described herein, e.g., of a computing system 402. In some examples, at least: operation 706 can include operation 806 or 810; operation 714 can be followed by operation 808; or operation 714 can include operation 812 or operation 816. For convenience, techniques 800 are described with reference to a scenario in which the control unit selects a first provider NF 118 for a first request 704(*c*) based at least in part on load data 708, and receives a second request 704(*e*), c<e.

Some examples use registration data, e.g., from NRF 104, to use in routing traffic. Some of these examples include operations 802 and 806.

At 802, the control unit can retrieve, via the network interface from a network registry device, registration information 804 (which can represent registration information 628). Examples are discussed herein, e.g., with reference to operation 626.

At 806(*n*), the control unit can select the respective provider NF for request 704(*n*) of the plurality of requests 704 based at least in part on the registration information 804. Examples are discussed herein, e.g., with reference to operations 518 and 630.

Some examples provide balancing of load across multiple provider NFs 118, or fallback if first provider NF 118 has become unreachable. Some of these examples include operations 808 and 810.

At 808, the control unit can receive a third request 704(*d*), c<d<e. Examples are discussed herein, e.g., with reference to operations 514, 602, and 702(*n*). Operation 808 can be performed after receiving the first request 704(*c*), and before receiving second request 704(*e*).

At 810, the control unit can select, based at least in part on the load data 708, a second provider NF 118 for the third request 704(*e*). The second provider NF 118 can be different from the first provider NF 118. Examples are discussed herein, e.g., with reference to operations 518, 622, and 630.

Some examples include operations 802 and 808. In some of these examples, the first request 704(*c*) is associated with a terminal and the third request 704(*e*) is also associated with the terminal. The registration information 804 can specify that the terminal 306 is associated with the first provider NF and that the terminal 306 is not associated with the second provider NF. Some of these examples can increase the range of available servers to improve load balancing. Examples are discussed herein, e.g., with reference to operation 626.

At 812, the control unit can detect the violation 716 at least partly by determining that the first provider NF 118 has not provided a response to the first request within a predetermined time period 814 (which can represent time period 612) after the forwarding of the first request 704(*c*). Examples are discussed herein, e.g., with reference to operation 610.

At 816, the control unit can detect the violation 716 at least partly by determining that the first provider NF has provided an error response 818 (which can represent error response 616) (e.g., a Service Unavailable or Internal Server Error) to the first request 704(*c*). Examples are discussed herein, e.g., with reference to operation 614.

FIG. 9 shows an example system 900 for managing network requests. A core network device 902 (which can represent SCP 102) includes a first network interface (which can represent network interface 416) and is configured to perform technique 1000. A network registry device 904 (which can represent NRF 104) includes a second network interface (which can represent network interface 416) and is configured to perform technique 1100. In various examples, core network device can be configured to perform operations of SCP 102 shown in FIGS. 1-3, or operations shown in any of FIGS. 5-8. In various examples, network registry device 904 can be configured to perform operations of NRF 104 shown in FIG. 1 or 3.

In some examples, core network device 902 is configured to forward a request to a first provider NF 118 (operation 1006), and network registry device 904 is configured to select a second provider NF 118 (operation 1110). In some examples, system 900 is communicatively connected with the first and second provider NFs 118. In some examples, system 900 further includes at least one provider NF 118, e.g., the first and second provider NFs 118. In some examples, the provider NFs 118 can share state on the back end so that any of them can handle requests forwarded by core network device 902. For example, the first provider NF 118 and the second provider NF 118 can be configured to synchronize data associated with the first NFType with each other. The data can include, e.g., subscription information.

FIG. 10 is a dataflow diagram that illustrates an example technique 1000 for processing a network request, and related dataflow (shown dashed for clarity). Technique 1000 can be performed by a control unit, e.g., as discussed herein with reference to FIG. 4, of core network device 902.

At 1002, the control unit can receive, via the first network interface, a first request 1004 (which can represent first request 504, 704) from a consumer network function (NF). Examples are discussed herein, e.g., with reference to operations 502 and 702.

At 1006, the control unit can forward the first request 1004 via the first network interface to a first provider NF 118. The first provider NF 118 can be associated with a first network-function type (NFType). Examples are discussed herein, e.g., with reference to operations 506, 706, and 712. In some examples, the first provider NF 118 can be a provider NF indicated in registration information 628, 804 or other information from network registry device 904.

At 1008, the control unit can detect, at a time after forwarding the first request, a violation 1010 (which can represent violation 510, 716) by the first provider NF of a predetermined response criterion 1012 (which can represent criterion 512, 718) with respect to the first request 1004.

Examples are discussed herein, e.g., with reference to operations 508 and 714, and FIGS. 6 and 8.

At 1014, the control unit can transmit an indication 1016 of the violation 1010 to the network registry device 904. Operation 1014 can be performed in response to the detection at operation 1008 of the violation 1010. Examples are discussed herein, e.g., with reference to FIG. 1 #11 and operations 720 and 724.

FIG. 11 is a dataflow diagram that illustrates an example technique 1100 for selecting provider NFs, and related dataflow (shown dashed for clarity). Technique 1100 can be performed by a control unit, e.g., as discussed herein with reference to FIG. 4, of network registry device 904.

At 1102, the control unit can receive a discovery request 1104 (which can represent a discovery query such as FIG. 1 #3, #4) associated with the first NFType. Examples are discussed herein, e.g., with reference to FIG. 1.

At 1106, the control unit can receive an indication 1108 (which can represent indication 1016) of a violation of one or more response criteria (e.g., violation 1010 of criterion 1012). Examples are discussed herein, e.g., with reference to FIGS. 1 and 2, and operation 1014. Operations 1102 and 1106 are mutually independent in some examples.

At 1110, the control unit can select a second provider NF that is associated with the first NFType and that is different from the first provider NF. For example, the control unit can determine an identification 1112 (which can represent identification 624, 710) of second provider NF 118. Operation 1110 can be performed after operation 1106, or after both operation 1102 and operation 1106. Examples are discussed herein, e.g., with reference to FIG. 1, FIG. 2 #14, and operations 518, 630, and 706.

In some examples, operation 1110 can include selecting, as the second provider NF 118, a provider NF 118 that is different from a first provider NF 118 previously reported to core network device 902, e.g., as part of load data 204, 708 or registration information 628, 804. Additionally or alternatively, operation 1106 can include removing the first provider NF 118 from a list (e.g., stored in datastore 424) of available provider NFs 118, and operation 1110 can include selecting the second provider NF 118 from the list after the first provider NF 118 has been removed.

At 1114, the control unit can send, via the second network interface, an indication 1116 (which can represent identification 1112). Examples are discussed herein, e.g., with reference to FIG. 1 #5 and operations 626 and 802.

Figure 12:
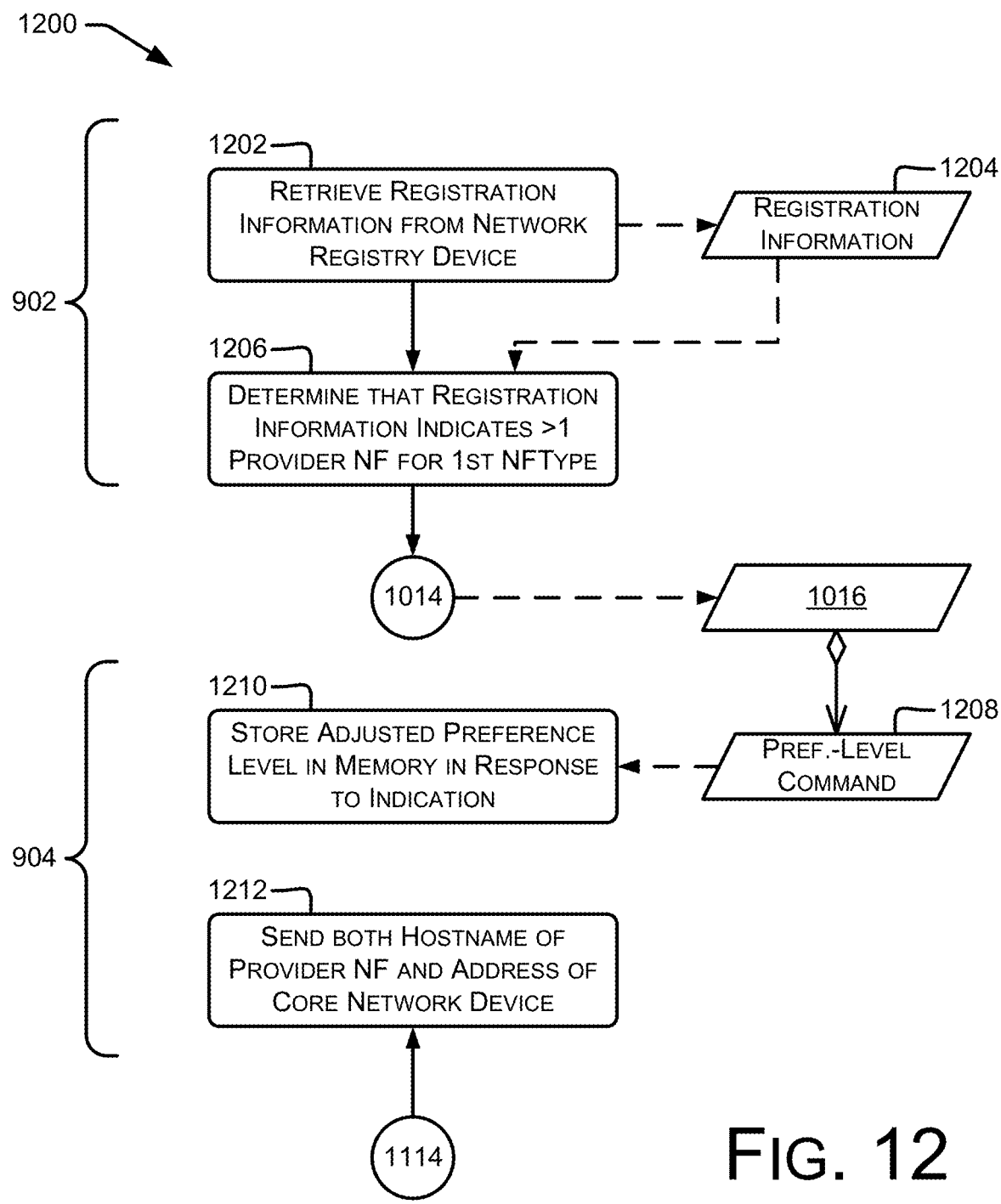
FIG. 12 is a dataflow diagram illustrating example techniques for processing requests for network service, and related data items, according to various examples.

FIG. 12 is a dataflow diagram that illustrates example techniques 1200 for processing requests for network service, and related dataflow (shown dashed for clarity). In some examples, techniques 1200 can be performed by a control unit, as described herein, e.g., of a computing system 402. In some examples, at least: operation 1014 can be preceded by operations 1202 and 1206; operation 1014 can be followed by operation 1210; or operation 1114 can be followed by operation 1212. In some examples, operations 1202 and 1206 can be performed by core network device 902 (e.g., a control unit thereof) and operations 1210 and 1212 can be performed by network registry device 904 (e.g., a control unit thereof).

In some examples, SCP 102 or other core network device 902 queries NRF 104 or other network registry device 904 for registration information. Some of these examples include operations 1202 and 1206 performed at core network device 902.

At\\1202, the control unit of core network device 902 can retrieve registration information 1204 (which can represent or include information transmitted in FIG. 1 #1, 2, 5, or 6, or registration information 628, 804) from the network registry device 904 via network interface 416. Examples are discussed herein, e.g., with reference to operations 626 and 802.

At 1206, the control unit can determine, before transmitting (operation 1014) the indication 1016 of the violation 1010, that the registration information 1204 indicates at least two provider NFs that are associated with the first NFType referenced at operation 1006. For example, the control unit can locate descriptions in registration information 1204 of provider NFs 118, and count the number of such descriptions that include data indicating support for the first NFType.

In some examples, indication 1016 of violation 1010 comprises a command 1208 to adjust a preference level associated with the first provider NF referenced at operation 1006. Network registry device 904 includes a computer-readable memory, e.g., datastore 424 or a component thereof. Some of these examples include operation 1210.

At 1210, the control unit of network registry device 904 can store an adjusted preference level in the memory in response to the command 1208. For example, core network device 902 can send command 1208 to cause network registry device 904, e.g., NRF 104, to adjust the proportion of requests sent to a particular provider NF 118 using the NRF preference-level mechanism or similar mechanisms. This can permit network registry device 904 to select provider NF(s) 118 in response to discovery requests based on the provider-NF load observed by the core network device 902 without requiring that load information and other types of preference information be handled separately. This can simplify processing at network registry device 904, which can reduce packet latency at network registry device 904.

In some examples, NRF 104 provides, as part of discovery responses such as FIG. 1 #5, the hostname of a provider NF 118 but the IP address of an SCP 102. This permits the SCP to proxy traffic based on, e.g., the value of an HTTP Host header or other data that indicates a target hostname. Some of these examples include operation 1212.

At 1212, the control unit of network registry device 904 can send, as part of or accompanying the indication 1112 of the second provider NF, both: a hostname (e.g., a fully-qualified domain name or other domain name) associated with the second provider NF 118; and a network address associated with the core network device 902. For example, the network address can be carried in an Nnrf IpEndPoint.{ipv4Address,ipv6Address} field. In some examples, network registry device 904 does not send a network address of the second provider NF 118.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

1: A method performed by a core network device, the method comprising: receiving, via a network interface, a first request from a consumer network function (NF); forwarding the first request via the network interface to a first provider NF; detecting, at a time after forwarding the first request, a violation by the first provider NF of a predetermined response criterion with respect to the first request; receiving, via the network interface, a second request; and forwarding the second request to a second provider NF different from the first provider NF at least partly in response to the violation.

2: The method as paragraph 1 recites, further comprising detecting the violation at least partly by determining that the first provider NF has not provided a response to the first request within a predetermined time period after the forwarding of the first request.

3: The method as paragraph 1 recites, further comprising detecting the violation at least partly by determining that the first provider NF has provided an error response to the first request.

4: The method as paragraph 1 recites, further comprising: locating a service identifier in the second request; and selecting the second provider NF based at least in part on the service identifier.

5: The method as paragraph 1 recites, further comprising: receiving, via the network interface, a plurality of requests, the plurality of requests comprising the second request and a third request; and forwarding the third request to the first provider NF after detecting the violation by the first provider NF.

6: The method as paragraph 5 recites, wherein: the first request comprises an initial request for initialization of state data; and the second request comprises an update request for modification of the state data.

7: The method as paragraph 1 recites, further comprising: retrieving from a network registry device, registration information; and selecting the second provider NF based at least in part on the registration information.

8: The method as paragraph 7 recites, wherein: the first request is associated with a terminal; the second request is associated with the terminal; the registration information specifies that the terminal is associated with the first provider NF; and the registration information specifies that the terminal is not associated with the second provider NF.

9: At least one tangible, non-transitory computer-readable medium comprising instructions that, when executed by one or more processors, cause the one or more processors to perform: first operations comprising, for each request of a plurality of requests: receiving, via a network interface, that request from a consumer network function (NF); selecting a respective provider NF of a plurality of provider NFs based at least in part on load data; and forwarding the first request via the network interface to the selected respective provider NF; second operations comprising: detecting, at a time after forwarding a first request of the plurality of requests, a violation of a predetermined response criterion with respect to the first request by a first provider NF of the plurality of provider NFs; and in response, modifying the load data to decrease the proportion of requests of the plurality of requests subsequent to the first request for which the first provider NF is selected; and third operations comprising: detecting, at a time after detecting the violation of the predetermined response criterion, that the first provider NF has satisfied the predetermined response criterion with respect to a second request of the plurality of requests; and in response, modifying the load data to increase the proportion of requests of the plurality of requests subsequent to the second request for which the first provider NF is selected.

10: The at least one tangible, non-transitory computer-readable medium as paragraph 9 recites, the second operations comprising detecting the violation at least partly by determining that the first provider NF has not provided a response to the first request within a predetermined time period after the forwarding of the first request.

11: The at least one tangible, non-transitory computer-readable medium as paragraph 9recites, the second operations comprising detecting the violation at least partly by determining that the first provider NF has provided an error response to the first request.

12: The at least one tangible, non-transitory computer-readable medium as paragraph 9 recites, the first operations comprising: in response to the load data, selecting the first provider NF for the first request; after receiving the first request, and before receiving the second request, receiving a third request; and selecting, based at least in part on the load data, a second provider NF for the third request, wherein the second provider NF is different from the first provider NF.

13: The at least one tangible, non-transitory computer-readable medium as paragraph 12 recites, wherein: the first operations comprise retrieving from a network registry device, registration information; the first request is associated with a terminal; the third request is associated with the terminal; the registration information specifies that the terminal is associated with the first provider NF; and the registration information specifies that the terminal is not associated with the second provider NF.

14: The at least one tangible, non-transitory computer-readable medium as paragraph 9 recites, wherein: an earlier request of the plurality of requests comprises an initial request for initialization of state data; and a later request of the plurality of requests comprises an update request for modification of the state data.

15: The at least one tangible, non-transitory computer-readable medium as paragraph 9 recites, further comprising: retrieving from a network registry device, registration information; and selecting the respective provider NF for a request of the plurality of requests based at least in part on the registration information.

16: A system comprising: a core network device comprising a first network interface and configured to perform first operations; and a network registry device comprising a second network interface configured to perform second operations; wherein the first operations comprise: receiving, via the first network interface, a first request from a consumer network function (NF); forwarding the first request via the first network interface to a first provider NF, wherein the first provider NF is associated with a first network-function type (NFType); detecting, at a time after forwarding the first request, a violation by the first provider NF of a predetermined response criterion with respect to the first request; and in response, transmitting an indication of the violation to the network registry device; and wherein the second operations comprise: receiving a discovery request associated with the first NFType; receiving the indication of the violation; selecting, subsequently, a second provider NF that is associated with the first NFType and that is different from the first provider NF; and sending, via the second network interface, an indication of the second provider NF.

17: The system as paragraph 16 recites, wherein: the indication of the violation comprises a command to adjust a preference level associated with the first provider NF; the network registry device comprises a computer-readable memory; and the second operations comprise storing an adjusted preference level in the memory in response to the command.

18: The system as paragraph 16 recites, the second operations comprising sending, as part of or accompanying the indication of the second provider NF, both: a hostname associated with the second provider NF; and a network address associated with the core network device.

19: The system as paragraph 16 recites, the first operations comprising: retrieving registration information from the network registry device; and determining, before transmitting the indication of the violation, that the registration information indicates at least two provider NFs that are associated with the first NFType; and transmitting the indication of the violation at least partly in response.

20: The system as paragraph 16 recites, wherein: the system further comprises the first provider NF and a second provider NF; and the first provider NF and the second provider NF are configured to synchronize data associated with the first NFType with each other.

21: Any of the above, wherein at least one of, or all of, the network registry device(s) is not a DNS server.

22: At least one feature from each of at least two of: a method, a non-transitory computer-readable medium, or a system.

23: A computer-readable medium, e.g., a computer storage medium, having thereon computer-executable instructions, the computer-executable instructions upon execution configuring a computer to perform operations as any of paragraphs 1-8 recites.

24: A device comprising: a processor; and a computer-readable medium, e.g., a computer storage medium, having thereon computer-executable instructions, the computer-executable instructions upon execution by the processor configuring the device to perform operations as any of paragraphs 1-8 recites.

25: A system comprising: means for processing; and means for storing having thereon computer-executable instructions, the computer-executable instructions including means to configure the system to carry out a method as any of paragraphs 1-8 recites.

26: A method comprising performing operations as any of paragraphs 1-8 recites.

CONCLUSION

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example techniques herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and techniques described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing systems 402, 426 or processors 404, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method performed by a service communication proxy (SCP) of a fifth generation (5G) network, the method comprising:
   receiving, via a network interface, a first request from a consumer network function (NF);
   forwarding the first request via the network interface to a first provider NF;
   receiving an error response to the first request from the first provider NF;
   detecting a violation by the first provider NF based at least in part on receiving the error response, the violation including the first provider NF timing out at more than a determined average rate;
   receiving, via the network interface, a second request; and
   forwarding the second request to a second provider NF.

2. The method according to claim 1, further comprising detecting the violation at least partly by determining that the first provider NF has not provided a response to the first request within a predetermined time period after the forwarding of the first request.

3. The method according to claim 1, further comprising:
   locating a service identifier in the second request; and
   selecting the second provider NF based at least in part on the service identifier.

4. The method according to claim 1, further comprising:
   receiving, via the network interface, a plurality of requests, the plurality of requests comprising the second request and a third request; and
   forwarding the third request to the first provider NF after detecting the violation by the first provider NF.

5. The method according to claim 4, wherein:
   the first request comprises an initial request for initialization of state data; and
   the second request comprises an update request for modification of the state data.

6. The method according to claim 1, further comprising:
   retrieving, from a network registry device, registration information; and
   selecting the second provider NF based at least in part on the registration information.

7. The method according to claim 6, wherein:
   the first request is associated with a terminal;
   the second request is associated with the terminal;
   the registration information specifies that the terminal is associated with the first provider NF; and
   the registration information specifies that the terminal is not associated with the second provider NF.

8. At least one tangible, non-transitory computer-readable medium comprising instructions that, when executed by one or more processors, cause the one or more processors to perform:
   receiving, via a network interface of a service communication proxy (SCP) operating in a fifth generation (5G) network, a first request from a consumer network function (NF);
   forwarding the first request via the network interface to a first provider NF;
   detecting a violation by the first provider NF of at least one predetermined response criterion stored by the SCP, the violation including the first provider NF timing out at more than a determined average rate;
   receiving, via the network interface, a second request; and
   forwarding the second request to a second provider NF.

9. The at least one tangible, non-transitory computer-readable medium according to claim 8, further comprising detecting the violation at least partly by determining that the first provider NF has not provided a response to the first request within a predetermined time period after the forwarding of the first request.

10. The at least one tangible, non-transitory computer-readable medium according to claim 8, further comprising detecting the violation at least partly by determining that the first provider NF has provided an error response to the first request.

11. The at least one tangible, non-transitory computer-readable medium according to claim 8, further comprising:
    locating a service identifier in the second request; and
    selecting the second provider NF based at least in part on the service identifier.

12. The at least one tangible, non-transitory computer-readable medium according to claim 8, further comprising:
    receiving, via the network interface, a plurality of requests, the plurality of requests comprising the second request and a third request; and
    forwarding the third request to the first provider NF after detecting the violation by the first provider NF.

13. The at least one tangible, non-transitory computer-readable medium according to claim 12, wherein:
    the first request comprises an initial request for initialization of state data; and
    the second request comprises an update request for modification of the state data.

14. The at least one tangible, non-transitory computer-readable medium according to claim 8, further comprising:
    retrieving, from a network registry device, registration information; and
    selecting the second provider NF based at least in part on the registration information.

15. The at least one tangible, non-transitory computer-readable medium according to claim 14, wherein:
    the first request is associated with a terminal;
    the second request is associated with the terminal;
    the registration information specifies that the terminal is associated with the first provider NF; and
    the registration information specifies that the terminal is not associated with the second provider NF.

16. A system comprising:

a service communication proxy (SCP) of a fifth generation (5G) network including a network interface and configured to perform one or more operations comprising:

receiving, via a network interface, a first request from a consumer network function (NF);

forwarding the first request via the network interface to a first provider NF;

detecting a violation by the first provider NF based at least in part on receiving an error response, the error response comprising at least one of a request timeout, an internal server error, a service unavailable response, or a gateway timeout response;

storing an indication of the violation by the SCP as a stored violation;

receiving, via the network interface, a second request; and forwarding the second request to a second provider NF based at least in part on the stored violation.

17. The system according to claim 16, further comprising detecting the violation at least partly by determining that the first provider NF has not provided a response to the first request within a predetermined time period after the forwarding of the first request.

18. The system according to claim 16, further comprising detecting the violation at least partly by determining that the first provider NF has provided an error response to the first request.

19. The system according to claim 16, further comprising:

locating a service identifier in the second request; and selecting the second provider NF based at least in part on the service identifier.

20. The method according to claim 1, wherein the violation comprises a delayed response received from the first provider NF.

* * * * *